Nov. 24, 1931.  S. B. HASELTINE  1,832,931
FRICTION SHOCK ABSORBING MECHANISM
Filed Aug. 2, 1923  2 Sheets-Sheet 1
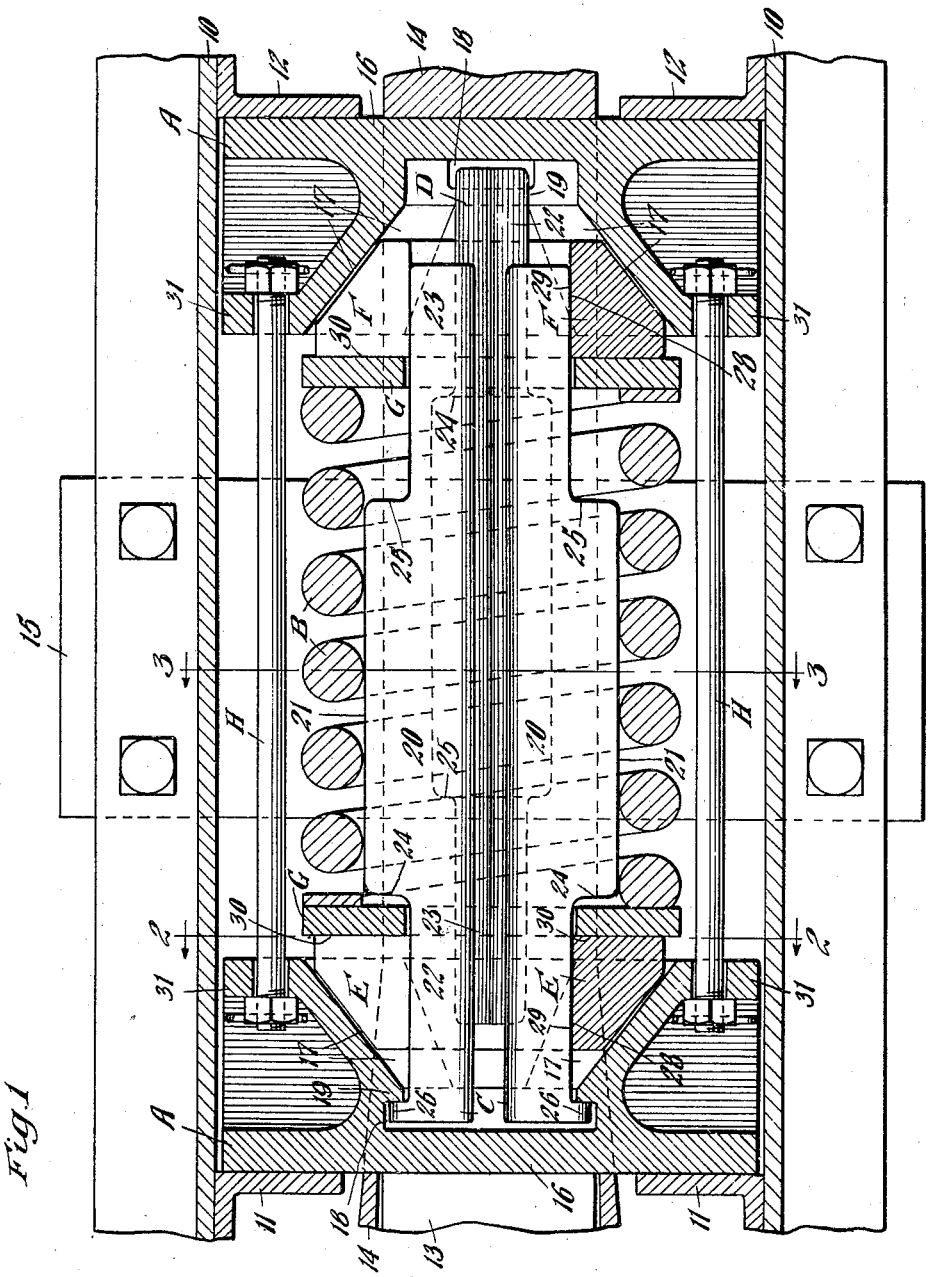
Witnesses
Wm. Geiger
Inventor
Stacy B. Haseltine
By George I. Haight
His Atty Nov. 24, 1931.  S. B. HASELTINE  1,832,931
FRICTION SHOCK ABSORBING MECHANISM
Filed Aug. 2, 1923   2 Sheets-Sheet 2
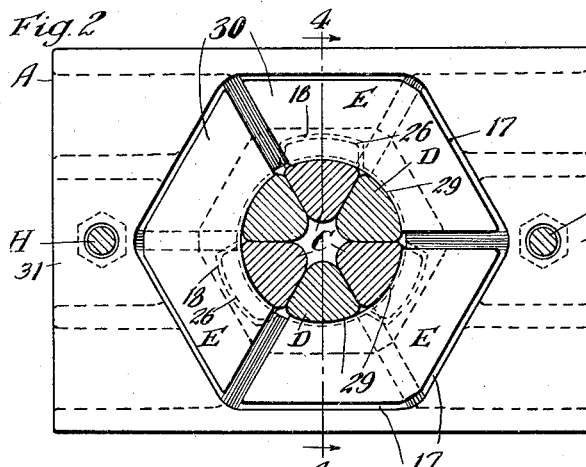
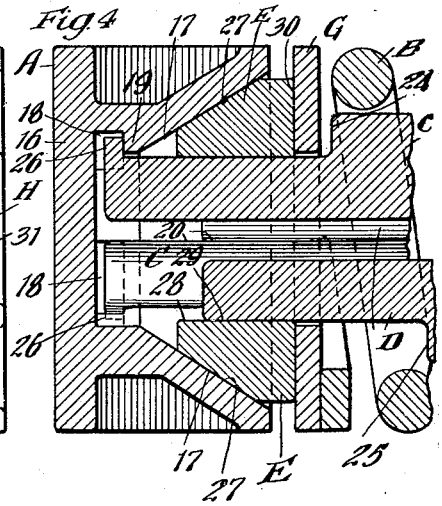
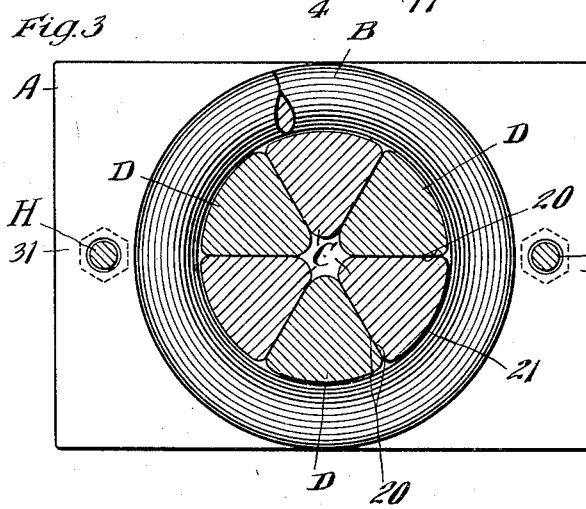
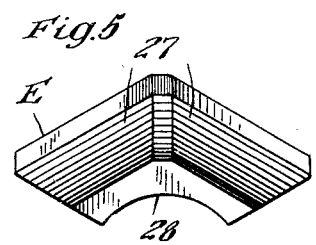
Witnesses
Wm. Geiger
Inventor
Stacy B. Haseltine
By George I. Haight
Atty.

Patented Nov. 24, 1931

1,832,931

UNITED STATES PATENT OFFICE

STACY B. HASELTINE, OF CHICAGO, ILLINOIS, ASSIGNOR, BY MESNE ASSIGNMENTS, TO W. H. MINER, INC., OF CHICAGO, ILLINOIS, A CORPORATION OF DELAWARE

FRICTION SHOCK ABSORBING MECHANISM

Application filed August 2, 1923. Serial No. 655,222.

This invention relates to improvements in friction shock absorbing mechanisms.

One object of the invention is to provide a friction shock absorbing mechanism especially adapted for railway draft riggings, wherein high frictional capacity is obtained combined with certain release.

More specifically, an object of the invention is to provide a mechanism of the character indicated in the preceding paragraph wherein are employed a plurality of longitudinally arranged friction elements divided into two series, those of one series being alternated with those of the other and with the alternate friction elements having longitudinally engaging friction surfaces radially disposed with respect to the axis of the mechanism.

A still further object of the invention is to provide a mechanism of the character indicated in the preceding paragraphs wherein the plurality of elements constituting one set are anchored to one end follower and the elements of the other set are anchored to the opposite end follower to insure restoration of all of the parts in the release action.

In the drawings forming a part of this specification, Fig. 1 is a horizontal longitudinal sectional view of a portion of a railway draft rigging showing my improvements in connection therewith. Fig. 2 is a vertical transverse sectional view of the shock absorbing mechanism proper corresponding to the line 2—2 of Fig. 1. Fig. 3 is a view similar to Fig. 2 but corresponding to the section line 3—3 of Fig. 1. Fig. 4 is a broken vertical longitudinal sectional view corresponding substantially to the line 4—4 of Fig. 2. And Fig. 5 is a detailed, perspective end view of one of the wedge elements employed in my construction.

In said drawings, 10—10 denote the usual draft sills of a car underframe to the inner faces of which are secured front stop lugs 11 and rear stop lugs 12. A portion of a drawbar is indicated at 13, the same being operatively associated with the shock absorbing mechanism proper by a hooded cast yoke 14. Said yoke and the parts therewithin are supported in operative position by a detachable saddle plate 15. The improved shock absorbing mechanism, as shown, comprises, broadly, front and rear wedge followers A—A; a spring B; two sets of longitudinally arranged friction elements C and D; a plurality of front wedge elements E; a plurality of rear wedge elements F; spring followers G—G; and a pair of retainer bolts H—H.

The two end followers A are of like construction and each is formed with an end, transversely extending flat wall 16 adapted to co-operate with the corresponding adjacent stop lugs 11 or 12. On the side nearest the center of the mechanism, each follower is provided with a pocket with flared wedge faces 17—17, there being six of the latter symmetrically arranged with respect to the axis of the mechanism. At the inner end of the flaring socket, three recesses 18 are formed providing anchoring shoulders 19, as best illustrated in Figs. 1 and 4.

The two sets of friction elements C and D each comprises three elements of like construction. Each of said elements is of substantially triangular cross section, as best shown in Figs. 2 and 3, and with the longitudinally extending side faces 20—20 thereof making an angle of 60° with each other so that all of said longitudinally and radially extending friction surfaces 20 are in planes which, if projected, would pass through the axis of the mechanism. On its outer side, each element C and D is rounded, as indicated at 21, so that, when all of the six elements C and D are assembled, they present a substantially cylindrical outer periphery. At each end, each element C and D is of reduced cross section, as indicated at 22 and 23, although the form of the cross section remains the same, as shown best in Fig. 2. The reduced cross sections 22 result in shoulders 24 and the reduced cross sections 23 result in oppositely disposed shoulders 25, as shown in Fig. 1. Each of the elements C and D, at that end having the reduced cross sections 22, is provided with an out-turned flange 26, the flanges 26 of the three elements C being engaged in the corresponding recesses 18 of the front follower A and the flanges 26 of the other three friction elements D being correspondingly engaged in the recesses 18 of the rear follower A. Each of said flanges 26 being of such thickness that when the elements C and D are in normal position with the flanges 26 in engagement with the shoulders 19 of the followers A, a certain amount of clearance is left between flanged ends of the elements and the walls 16 of the followers A, for a purpose hereinafter described.

At the front end of the mechanism, the three wedge elements E are employed, each extending through an arc of approximately 120° and provided with a pair of wedge faces 27—27, each of the latter being adapted to co-operate with one of the corresponding wedge faces 17 of the front follower A. On its inner side—that is, the side nearest the axis of the mechanism—each wedge element E is provided with an arcuate friction surface 28 adapted to engage two of the correspondingly curved surfaces 29—29 of the reduced section 22 of one element C and the reduced section 23 of another element D. On the side adjacent the spring, each wedge element E has a flat bearing surface 30 which engages the corresponding adjacent spring follower G. The rear set of wedges F are similar to those just described and co-operate in the same manner with the rear follower A and the opposite sets of ends of the friction elements C and D.

The spring B encircles all of the friction elements C and D and bears, at its opposite ends, upon the respective spring followers G—G, as clearly shown in Fig. 1, and is preferably under a certain amount of initial compression, when the various parts of the gear are in the normal positions shown in Fig. 1.

The retainer bolts H, two in number, are disposed at opposite sides of the mechanism and the same are suitably anchored to flanges 31 provided on the followers A—A. By said bolts H, the parts are held in assembled relation and also the spring B may be maintained under initial compression.

As clearly appears from Fig. 1, the elements C and D are made of such length as to permit the elements C to move toward the rear follower A and the elements D to move toward the front follower A, a distance slightly less than the intended compression stroke of the mechanism. Preferably, they will be made of such length, that at the end of the predetermined compression stroke, all elements C and D will be in engagement with both followers A—A, so that said elements will serve as a rigid column for the transmission of the ultimate shocks, the spring B being so designed as to permit of this result before the full travel of the latter member has been exhausted.

The operation is as follows, assuming an inward or buffing movement of the draw-bar. As the front follower A moves inwardly with the draw-bar, the front set of wedge elements E will be moved in unison with the follower and a simultaneous wedging action will result between the rear set of wedge elements F and the rear follower A, thus tending to force all of the wedge elements E and F inwardly toward the axial line of the mechanism and more firmly pressing the friction elements C and D into frictional contact. Initially, there will be a slight longitudinal movement of the wedge elements E with respect to the friction elements C and D, and also a slight relative longitudinal movement of the friction elements C and D with respect to the rear set of wedge elements F, and until the slight clearance left between the ends of the friction elements and the respective followers to which they are anchored is taken up. Thereafter, the friction elements C will be forced rearwardly in unison with the movement of the follower A, thus causing the friction elements C which are alternated with respect to the friction elements D to slide longitudinally along the latter and generating friction on the various sets of friction surfaces 20—20. During this action, it is obvious that the spring will be compressed and upon the discontinuance of the actuating force, the spring B will expand. At the initiation of the release action, the front follower A, due to the relatively obtuse angle included between any two diametrically opposite faces of its inner wedging surface, is free to move outwardly slightly with respect to the friction elements C and until the follower A engages with the flanges 26 of said elements C. This facilitates the release since collapse of the front set of wedge elements is permitted and thereafter the friction elements C are pulled outwardly in unison with the follower A, it being understood that a similar collapse in the wedge system at the rear end of the mechanism will take place during the release action.

With my arrangement I obtain a large area of friction surfaces; the arrangement of parts is compact; all of the friction and wedge elements may be made at comparatively small expense in the form of castings; and it will also be noted that I obtain compensation for wear, inasmuch as the wedge elements E and F may gradually separate or work into the respective followers A as the column system of friction elements C and D gets gradually smaller.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a plurality of longitudinally extending friction elements arranged in a circular series having longitudinally extending co-operable friction surfaces, alternate ones of said elements being slidable with respect to the remaining elements; relatively movable end followers adapted to directly engage said friction elements to effect relative movement thereof upon relative movement of said followers; a plurality of wedge elements at each end of said friction elements and co-operable with the latter for pressing the same into tight frictional engagement during a compression stroke; and a main spring resistance.

2. In a friction shock absorbing mechanism, the combination with a central column composed of a plurality of longitudinally extending friction elements having longitudinally arranged friction surfaces engaging with each other, said friction surfaces also extending radially with respect to the axis of the mechanism; of a spring resistance encircling said column; relatively movable end followers adapted to directly engage said elements to effect relative movement thereof upon relative movement of the followers; and wedge means, at each end of said column, interposed between the adjacent end of the spring, the corresponding end follower and said friction elements.

3. In a friction shock absorbing mechanism, the combination with end followers: of a plurality of longitudinally extending friction elements having longitudinally arranged co-operating friction surfaces and arranged to have alternate ones of said elements slide with respect to the remaining elements; wedge pressure creating means including a plurality of wedge elements at each end of said friction elements, each of said wedge elements having frictional engagement with two adjacent friction elements, and spring means opposing movement of said wedge elements.

4. In a friction shock absorbing mechanism, the combination with two and followers, each provided on its inner side with a socket having a plurality of wedge faces symmetrically arranged with respect to the axis of the mechanism; two series of longitudinally arranged friction elements, the ends of one series being anchored to one follower and the opposite ends of the other series anchored to the other follower, said elements being alternated and arranged in a circular series; a spring encircling said friction elements; and a set of wedge elements co-operating with the wedge faces of each follower and the adjacent ends of the friction elements.

5. In a friction shock absorbing mechanism, the combination with front and rear follower elements having interior, inwardly diverging wedge faces; of front and rear sets of friction wedge shoes co-operating with the wedge faces of said follower elements; a helical spring interposed between said front and rear sets of friction shoes; and a longitudinally disposed group of intercalated, relatively movable friction elements disposed within the coils of the spring, said friction elements and shoes being relatively movable, and said friction elements being adapted for direct engagement by said follower elements to effect relative movement thereof.

In witness that I claim the foregoing I have hereunto subscribed my name this 30th day of July, 1923.

STACY B. HASELTINE.